(12) United States Patent
Kurstjens

(10) Patent No.: US 12,209,375 B2
(45) Date of Patent: Jan. 28, 2025

(54) TP-FREE MONOPILE AND METHOD FOR FORMING THE SAME

(71) Applicant: Sif Holding N.V., Roermond (NL)

(72) Inventor: Michel Antoin Marie Kurstjens, Roermond (NL)

(73) Assignee: Sif Holding N.V., Roermond (NL)

( * ) Notice: Subject to any disclaimer, the term of this patent is extended or adjusted under 35 U.S.C. 154(b) by 382 days.

(21) Appl. No.: 17/281,818

(22) PCT Filed: Nov. 20, 2019

(86) PCT No.: PCT/NL2019/050761
§ 371 (c)(1),
(2) Date: Mar. 31, 2021

(87) PCT Pub. No.: WO2020/106146
PCT Pub. Date: May 28, 2020

(65) Prior Publication Data
US 2022/0018079 A1  Jan. 20, 2022

(30) Foreign Application Priority Data
Nov. 20, 2018 (NL) ..................................... 2022032

(51) Int. Cl.
*F03D 13/25* (2016.01)
*E02B 17/00* (2006.01)
(Continued)

(52) U.S. Cl.
CPC .......... *E02B 17/02* (2013.01); *E02B 17/0026* (2013.01); *E02D 27/525* (2013.01);
(Continued)

(58) Field of Classification Search
CPC ..... E02B 2017/0091; E02B 2017/0043; E02B 2017/0065; E02B 17/02; E02D 27/425; Y02E 10/727; F03D 13/25; F03D 13/22
See application file for complete search history.

(56) References Cited

U.S. PATENT DOCUMENTS

| 6,191,355 B1 | 2/2001 | Edelstein |
| 2010/0126079 A1* | 5/2010 | Kristensen ............. F03D 13/22 52/651.01 |

(Continued)

FOREIGN PATENT DOCUMENTS

| EP | 2011924 A2 | 1/2009 |
| JP | 2016519234 A | 6/2016 |

(Continued)

*Primary Examiner* — Sunil Singh
(74) *Attorney, Agent, or Firm* — Hoffmann & Baron, LLP

(57) ABSTRACT

An offshore structure that includes a pile of a foundation and at least one offshore element mounted on the pile and forming a slip joint, wherein disposed between an inner surface of the offshore element and an outer surface of the pile is a coating, especially an anti-fouling coating, for increasing friction between the two surfaces and/or preventing corrosion of one or both of the surfaces and/or at least two spaced apart areas are provided with a substance, forming a seal between the outer surface and the inner surface, near an upper end of the pile and the off shore element and between a lower end of the off shore element and the pile.

26 Claims, 12 Drawing Sheets

(51) Int. Cl.
*E02B 17/02* (2006.01)
*E02D 27/52* (2006.01)
*F03D 13/20* (2016.01)
*E02D 27/42* (2006.01)

(52) U.S. Cl.
CPC ............ *F03D 13/22* (2016.05); *F03D 13/25* (2016.05); *E02B 2017/0043* (2013.01); *E02B 2017/0065* (2013.01); *E02B 2017/0091* (2013.01); *E02D 27/425* (2013.01); *E02D 2300/0025* (2013.01); *E02D 2300/0051* (2013.01); *E02D 2450/00* (2013.01); *E02D 2600/20* (2013.01)

(56) References Cited

U.S. PATENT DOCUMENTS

| | | |
|---|---|---|
| 2011/0006538 A1 | 1/2011 | Fischer et al. |
| 2011/0138707 A1 | 6/2011 | Bagepalli |
| 2011/0154777 A1 | 6/2011 | Bagepalli |
| 2012/0243943 A1 | 9/2012 | Bögl et al. |
| 2016/0130779 A1 | 5/2016 | Van Dijk |

FOREIGN PATENT DOCUMENTS

| | | | |
|---|---|---|---|
| JP | 2017002751 A | 1/2017 | |
| JP | 2018040172 A | 3/2018 | |
| KR | 101524480 | 6/2015 | |
| WO | WO-2009026933 A1 * | 3/2009 | ............ F03D 13/22 |
| WO | 2018070868 A1 | 4/2018 | |

* cited by examiner

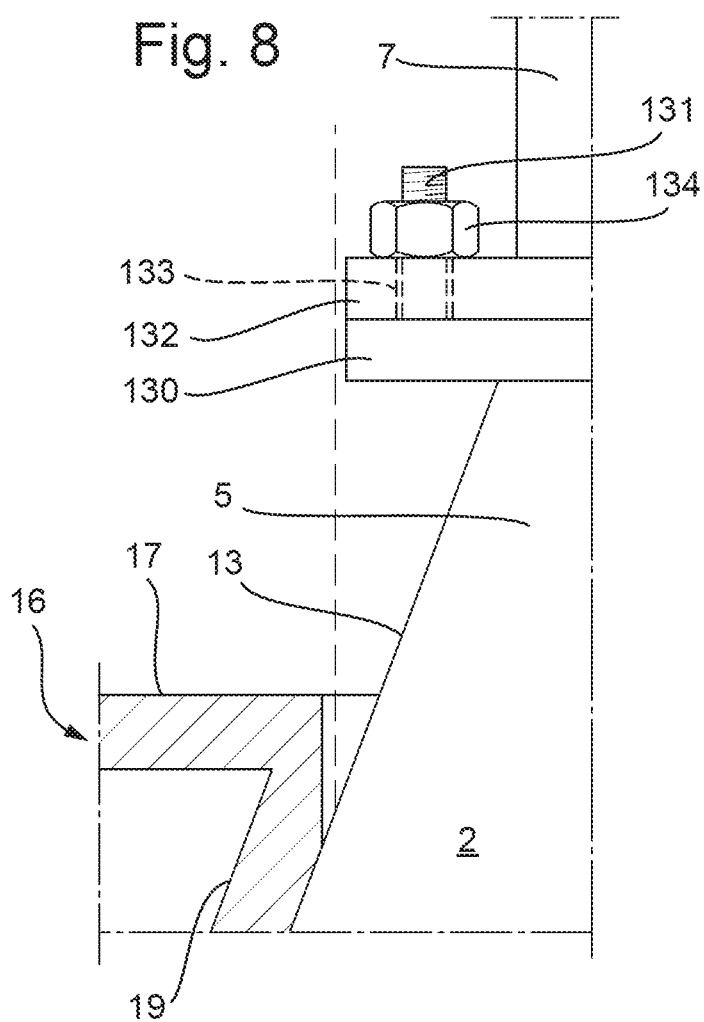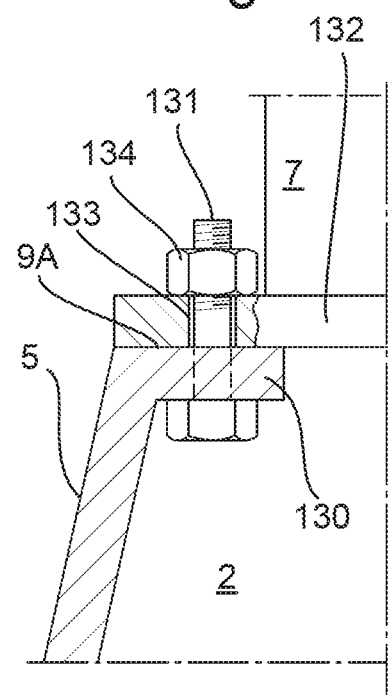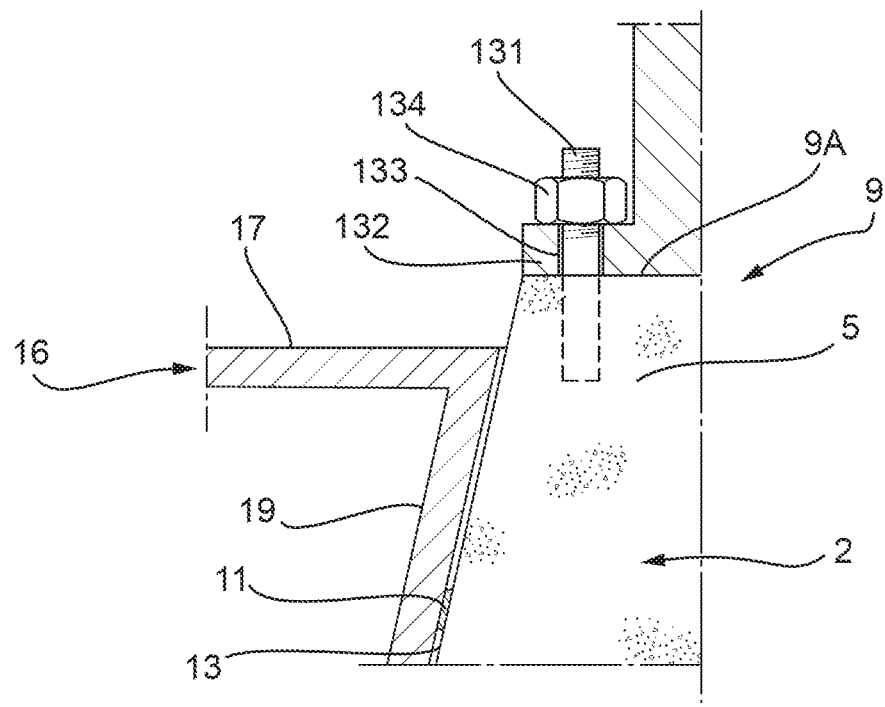

TP-FREE MONOPILE AND METHOD FOR FORMING THE SAME

This application claims priority from International Application No. PCT/NL2019/050761, filed on Nov. 20, 2019, which claims priority from The Netherlands patent application numbers NL 2022032, filed on Nov. 20, 2018, each of which is incorporated herein in its entirety.

TECHNICAL FIELD

The invention relates to a transition piece free (TP-free) monopile comprising a slip joint.

DESCRIPTION OF THE PRIOR ART

In offshore structures slip joints are used for mounting off-shore elements on foundation piles, such as monopiles driven into a sea bed. This means generally that an offshore element having a hollow part is slipped over a truncated conical shaped upper end of a pile. The hollow part has an inner surface which is shaped according to said conical upper end, such that it can be slipped over said end and forced onto said end by force of gravity. Such joints rely on gravity and friction between the outer surface of said upper end of the pile and the inner surface of the offshore element for maintaining the offshore element in position, even at high loads working on the offshore element and foundation, such as for example due to waves and/or wind. Slip joints may be suitable for easy mounting but removal of the off-shore structure from the pile may be difficult. Moreover existing slip joints require extensive and labor intensive maintenance. Furthermore existing slip joints require relatively long truncated top ends.

WO2018/070868 discloses an offshore structure comprising a pile of a foundation and at least one offshore element, mounted on the pile, forming a slip joint, wherein between an inner surface of the offshore element and an outer surface of the pile: —a coating, especially an anti-fouling coating is provided, increasing friction between the said two surfaces and/or preventing corrosion of one or both of said surfaces and/or —at least two spaced apart areas are provided with a substance, forming a seal between the said outer surface and the said inner surface, near an upper end of the pile and the off shore element and between a lower end of the off shore element and the pile.

US2011/154777 discloses a wind turbine tower which includes a first substantially tubular wall section having a tapered edge; a second substantially tubular wall section, arranged substantially coplanar with the first wall section, having a flared edge for seating against the tapered edge of the first wall section; and at least one fastener for securing the tapered edge of the first wall section to the flared edge of the second wall section. The at least one fastener includes a bolt extending through the tapered edge and the flared edge, and the bolt is arranged substantially perpendicular to a longitudinal axis of the first and second wall sections.

There is a need for improving slip joints in offshore tower structures.

SUMMARY OF THE INVENTION

In the present disclosure in one aspect an offshore structure is described, comprising a pile of a foundation and at least one offshore tower, mounted on the pile. A platform is also mounted on the pile, forming a slip joint. Between an inner surface of a platform mounting portion and an outer surface of the pile an anti-fouling coating can be provided. The coating is chosen for increasing friction between the said two surfaces and/or preventing corrosion of one or both of said surfaces. The tower is mounted to the pile by a bolt based mounting provision, in particular without using a slip joint. The platform is mounted to the pile by the slip joint, such that a walking area of the platform is provided at a level relative to the bolt based mounting provision, such that an average height maintenance operator can reach the bolt based mounting provision, preferably while standing on the walking area or alternatively while standing within the tower, e.g. on or near a top of the pile (in the latter case, the operator e.g. can reach the interior of the tower via a respective operator access that can be provided in the tower and that can be reached from the platform by the operator).

In an aspect the bolt based mounting provision can comprise a flange at or near a lower end of the tower which can be mounted to the top of the pile by bolts. In embodiments the top of the pile can be provided with a flange to which the lower end of the tower can be bolted. In embodiments both the lower end of the tower and the upper end of the pile can be provided with a flange, such that the flanges can be bolted together, for mounting the tower to the pile.

For example, according to an embodiment, the bolt based mounting provision can be arranged to fix a transversally extending mounting surface (e.g. a top surface) of the pile to a transversally extending mounting surface (e.g. a bottom surface) of the tower. After placement offshore (wherein, generally, the tower and pile extend substantially vertically), said mounting surfaces of the pile and tower can e.g. extend horizontally, and mechanically contact each other for supporting the tower on the pile. Thus, a weight of the tower exerts a gravity force that is directed normally with respect to those mounting surfaces, after offshore placement of the structure. In a further embodiment, at least one of said mounting surfaces can be a surface of a said flange.

In an aspect the platform can be designed such that it extends all around the upper end of the pile when mounted, and can be lifted over the upper end of the pile and, if provided, a flange mounted on or formed at the upper end of the pile, for forming a slip joint with the upper end of the pile.

The tower can be a tower of a wind mill. In advantageous embodiments the upper end of the pile is truncated cone shaped. The truncated part can have an upper end having an at least partly inward extending flange for bolting the tower to.

In an aspect the coating can provide for an increased surface roughness of the relevant surface of one of the pile and platform. The difference in surface roughness can be increased relative to the surface roughness difference between the surfaces as such. In embodiments the coating has a surface roughness higher than the surface roughness of the relevant part of the inner surface of the mounting part of the platform and/or of the outer surface of the pile on which said coating has been applied.

In embodiments the coating can be provided as a foil, preferably an adhesive foil, such as a self-adhesive foil.

In embodiments the coating can comprise a layer comprising fibers on a carrier foil. The fibers can be embedded in a resin or in another carrier system. Such resin can be an acrylic, especially a cured acrylic.

In an aspect the disclosure discloses a slip joint in which a coating is applied on the outer surface of the pile, especially on a truncated conical part of the pile, wherein the coating is chosen for increasing friction between the said two surfaces and/or preventing corrosion of one or both of said surfaces. In an aspect the disclosure discloses a slip joint in which a coating is applied to the inner surface of a mounting portion of a platform, wherein the coating is chosen for increasing friction between the said two surfaces and/or preventing corrosion of one or both of said surfaces. In embodiments the coating can be provided on both surfaces.

In embodiments the coating is free of organotin compounds. Organotin compounds are carbon compounds containing tin.

In an aspect of the disclosure an offshore structure is provided wherein a platform is mounted on a pile by a slip joint and a tower is mounted on the pile by a bolt based mounting provision, in particular without using a slip joint. A coating as disclosed can be provided between the platform and the pile. In this disclosure a tower has to be understood as including but not limited to windmills.

In an aspect the disclosure can be characterized in an offshore pile having a top end portion provided with an anti-fouling coating. A pile should in this disclosure at least be understood as meaning a pile for forming a foundation element for an offshore structure, which pile can be massive or can be hollow and can be mounted in a sea or ocean bed, for example by driving it into such sea or ocean bed. A pile can be made of any suitable material, including but not limited to concrete, metal or plastics, such as reinforced plastics, or combinations thereof. A pile can be a monopile or can be a compiled pile.

In an aspect of the disclosure a method for forming an offshore structure can comprise fitting a lower end of a platform over a top end of an offshore foundation pile, forming a slip joint. A surface area at the top end of the pile and/or a surface area of an inner surface of a mounting provision of the platform can be provided with an anti-fouling coating prior to placing said offshore element.

The coating can be applied in any suitable way. In a suitable embodiment the coating is applied by a film coating. Such film coating can be applied as an adhesive film, such as a film having a pressure sensitive adhesive. Such film coating can be applied by using a bonding agent applied to the film and/or surface on which the coating is to be applied.

Using a platform provided on a pile by a slip joint allows for easy mounting, whereas the pile can have a simple construction, without the necessity of providing special mounting provisions to and/or in the pile. The platform can then be used in an easy manner for personnel assisting in mounting the tower to the pile. Mounting the tower to the pile by bolt based mounting provisions can have the advantage of simple and effective mounting. The pile can have a relatively wide top, even if truncated for mounting the platform, providing a wide, proper base for mounting the tower to.

In embodiments the coating can be formed at least partly on the surface on which the coating is to be provided. For example by providing a resin on said surface and providing fibers in and/or on said resin.

In embodiments the coating can be applied such that at least overlapping surfaces of the top end of the pile and the mounting part of the platform are separated from each other by said coating.

BRIEF DESCRIPTION OF THE DRAWINGS

Embodiments of tower and platform mounted to a pile and a method will be discussed hereafter, with reference to the drawings, which are only given by way of example and should by no means be understood as limiting the scope of the disclosure or protection in any way or form. These examples are given in order to better understand the invention and are not restrictive. In these drawings:

FIG. 8-10 show schematically embodiments of bolting provisions on a foundation pile and tower;

DETAILED DESCRIPTION OF THE INVENTION

Figure 1:
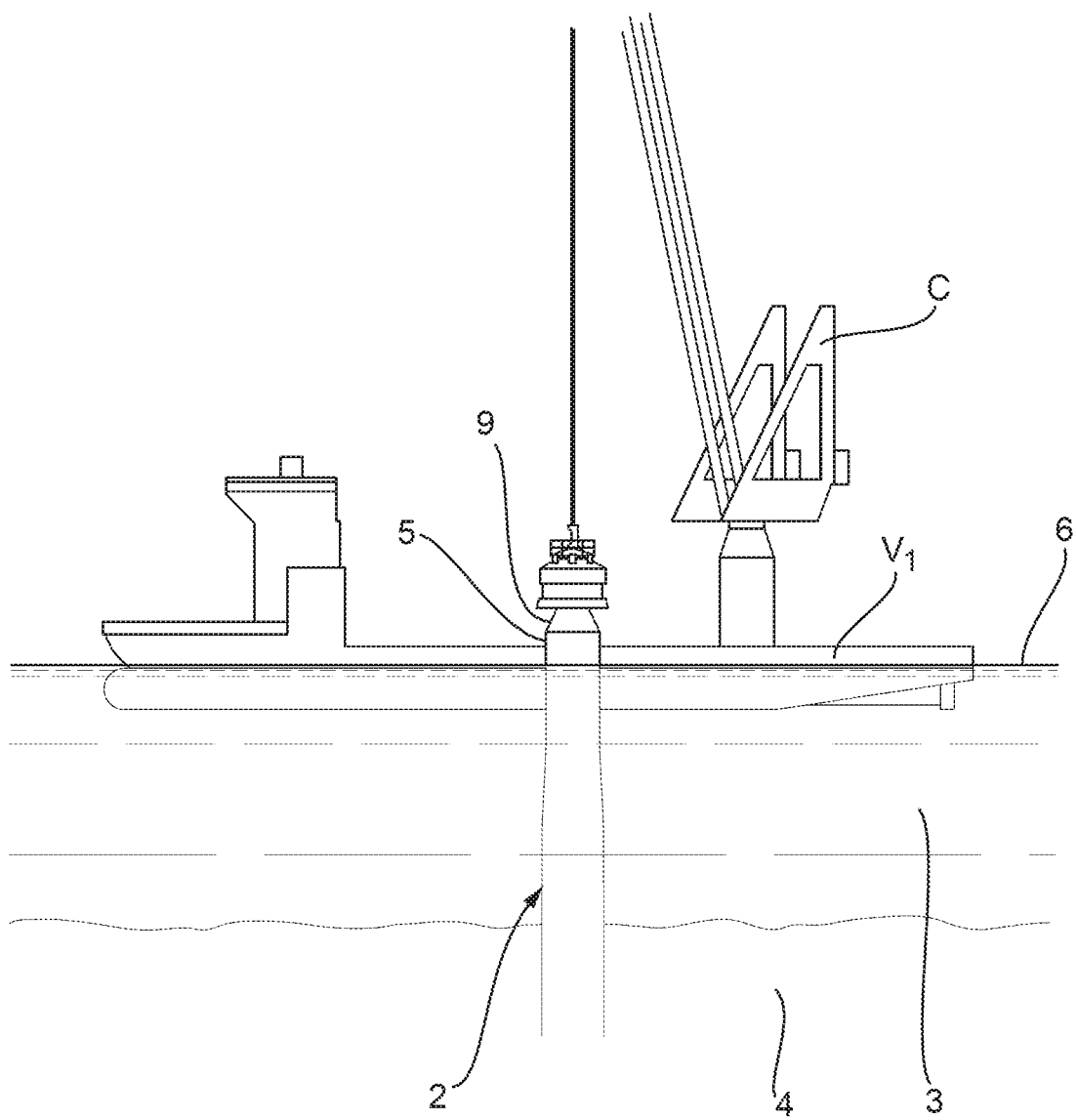
FIG. 1-5 schematically show steps in the method of placing a foundation pile and placing a platform and a tower, such as a windmill, on said foundation pile.

In this description the same or similar parts will be referred to by the same or similar reference signs. Though different embodiments or parts thereof are shown also combinations of embodiments should be considered having been disclosed herein.

In this description an offshore structure should be understood as at least including any structure founded in or on the bottom of a body of water, including but not limited to the bottom of a sea or ocean. In this disclosure an offshore structure can for example be a wind mill, drilling rig, electrical unit such as a transformer, or the like, preferably supported at least partly above a water surface of the body of water where the structure is positioned.

In this description coating of a surface should be understood as at least encompassing providing a coating layer such as a coating substance or coating film covering at least part of said surface. In preferred embodiments the coating will form a substantially closed layer over at least overlapping areas of the pile and the relevant part of the offshore element, such as a mounting part of a platform or tower.

In this description a platform mounted or to be mounted on a pile as disclosed should be understood as meaning at least but not limited to a platform surrounding at least partly the pile and/or a lower portion of a tower or leg mounted on the pile. Such platform can be suitable for landing of a vessel for transferring people and/or products to and from the offshore structure, and/or for people to move around the pile and/or tower or leg mounted on the pile safely. In the present disclosure the platform is mounted prior to fixing the tower to the pile, such that personnel can enter onto the platform and assist in positioning and fixing, especially bolting the tower to the pile (wherein, in particular, the tower is not fixed to the pile by using a slip joint).

According to an embodiment, the platform can be substantially made from metal, for example steel. In an alternative embodiment, the platform can be substantially made of concrete, e.g. by casting. Such a substantially concrete platform can be stable and durable, in particular in offshore conditions, and can be easily manufactured. A platform can also be made of different materials, such as but not limited to metal, e.g. steel, plastics, e.g. reinforced plastics, or combinations of said materials. This description discloses the use of a coating provided on an outer surface portion of the pile and/or an inner surface portion of the platform, especially a mounting part thereof, mounted on or to be mounted on the pile. Such coating can be an anti-fouling coating and/or anti-corrosion coating. Such coating can have a surface roughness higher than the surface roughness of the surface portion on which the coating is to be provided. A coating according to the disclosure is advantageously provided as a foil, which can also be referred to for example as film, sheet or the like wording. The coating can for example be formed by a self-adhesive foil, for example a foil provided with a pressure sensitive adhesive, or by a foil that can be adhered to the relevant surface by an adhesive. Alternatively a coating can be provided as a coating layer for example sprayed, rolled, dipped or brushed onto said surface. During application the coating can be formed, for example by providing a resin or such carrier onto said surface and then providing fibers on and/or into said resin. The coating can be machined after application in order to for example increase the surface roughness.

In the embodiments shown as a tower, especially a tower of a windmill is provided on a pile. Alternatively the tower can also be a tower or leg of another offshore element, such as an oil rig, power station or the like.

In this description the expressions "bolt based mounting provision", "bolting provision" and the-like are to be understood as deriving their mechanical strength mainly from one or more forces conferred, received and/or enacted by one or more bolts of the provision and/or from an act of bolting (i.e. actuating a bolt with respect to a suitable bolt receiving structure, e.g. a nut, and/or vice versa). It is well known and will be appreciated by the skilled person that a slip joint as such does not derive mechanical strength from any of such bolt based forces or from an act of bolting, so that a slip joint is per definition different from a bolt based mounting provision.

FIG. 1-5 show schematically steps of providing a foundation pile 2 and placing a platform 16 and a windmill 1 on the pile 2 placed offshore in a body of water 3. The body of water 3 can for example be a sea or ocean. As shown in FIG. 1 the pile 2 is driven into the bottom 4 of the body of water 3 in a suitable manner, such that at least an upper portion 5 extends above the surface 6 of the water 3. The pile can for example be hammered, vibrated, dug and/or sucked into the bottom, as known in the art. The surface 6 of water 3 is to be understood as regarded when the surface 6 is substantially flat, without waves.

Figure 2:
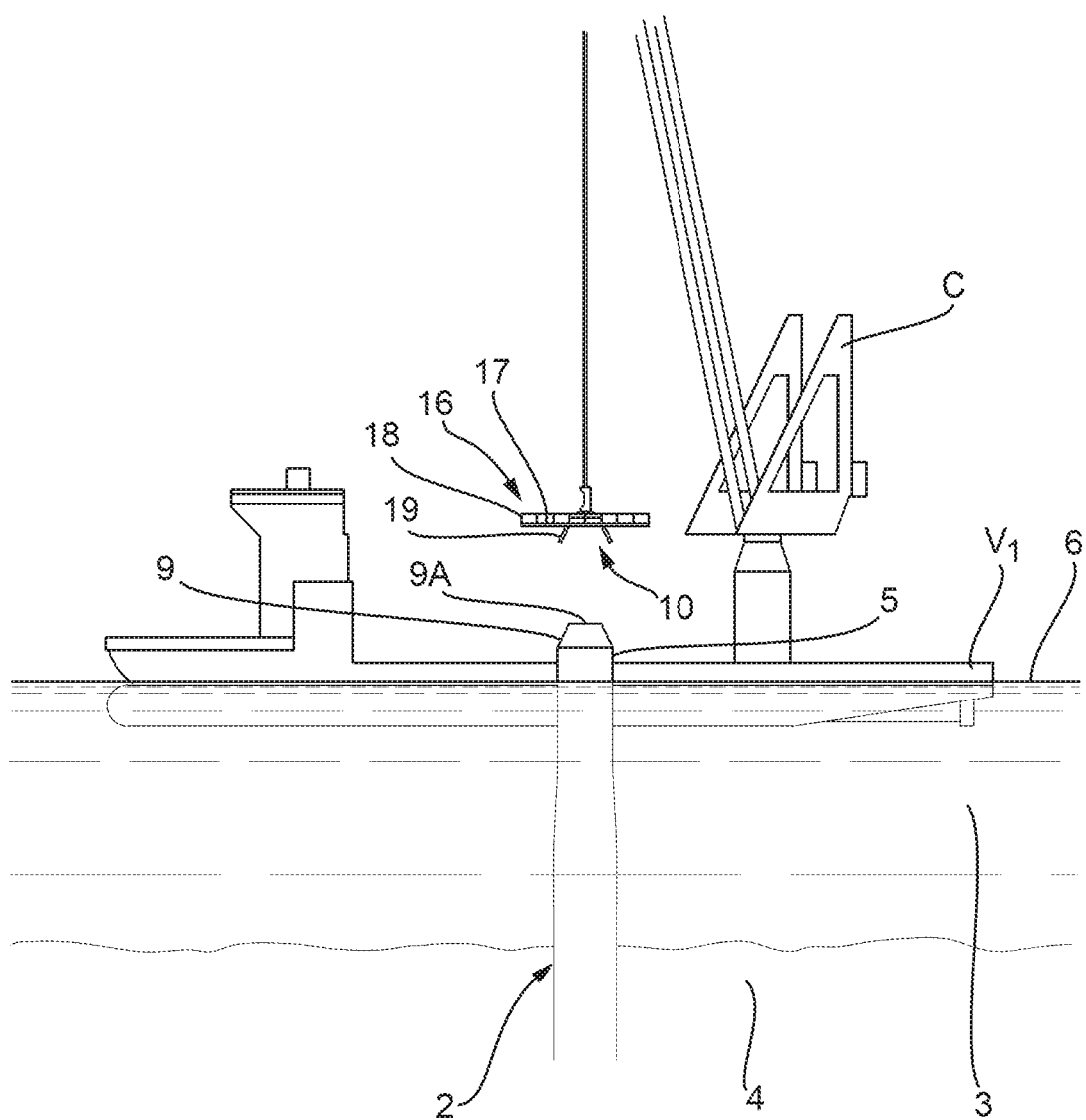

As can be seen in FIGS. 1 and 2, for example a vessel $V_1$ can be used for placing the pile 2, for example using a crane C. After the pile 2 has been properly placed, the same or a different crane C or other suitable machine can be used for placing a platform 16 onto the upper end 9 of the pile 2. To this end the platform 16 has a mounting part 19, as will be described hereafter, which can form a slip joint with the upper end 9 of the pile.

Figure 3:
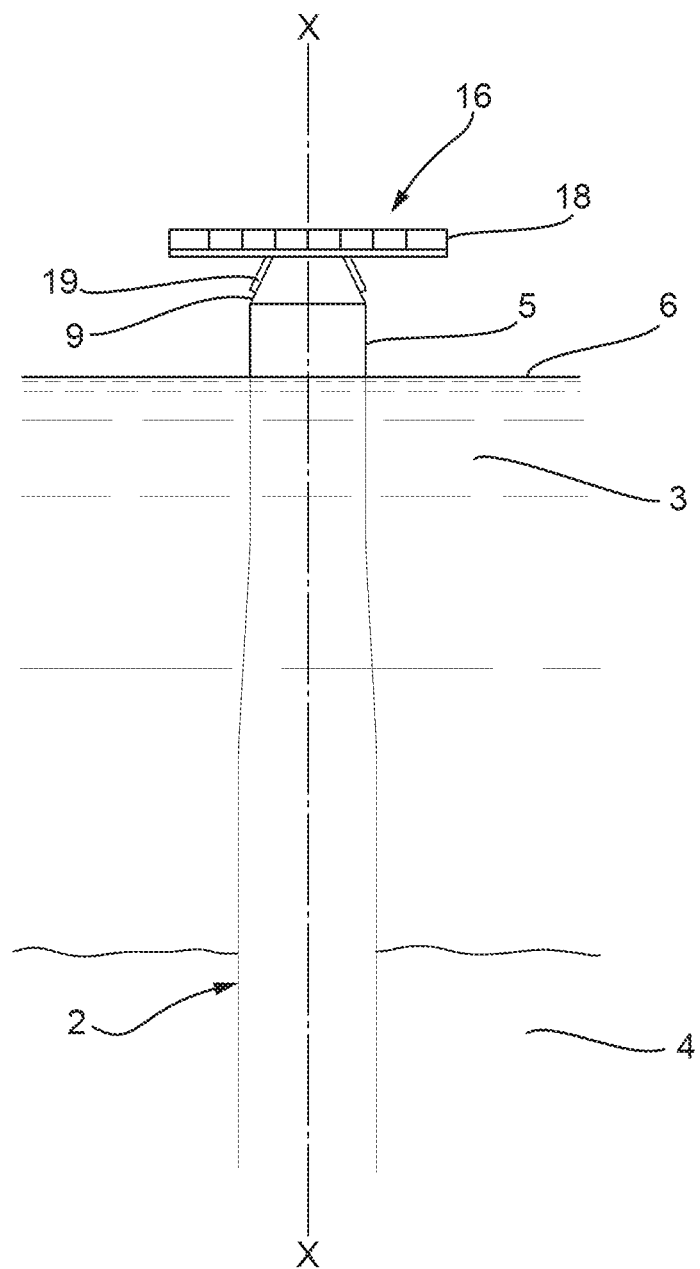

FIG. 3 shows schematically how the platform is positioned on the upper end 9 of the pile 2, such that a walking surface 17 of the platform 16 lies near the level of the upper end 9 of the pile 2, for example between no more than about 2 meters below and no more than about 2 meters above said upper end 9. Preferably the walking surface 17 lies at a level relative to the upper end 9 or at least bolting provisions B as will be described hereafter, provided at said end surface 9A, such that average height personnel can reach said surface 9A or bolting provisions B while resting, for example standing on said walking surface. An average height $H_{op}$ operator 120 should be understood as an operator having a standing height of between 1.6 and 2 meters.

Figure 4:
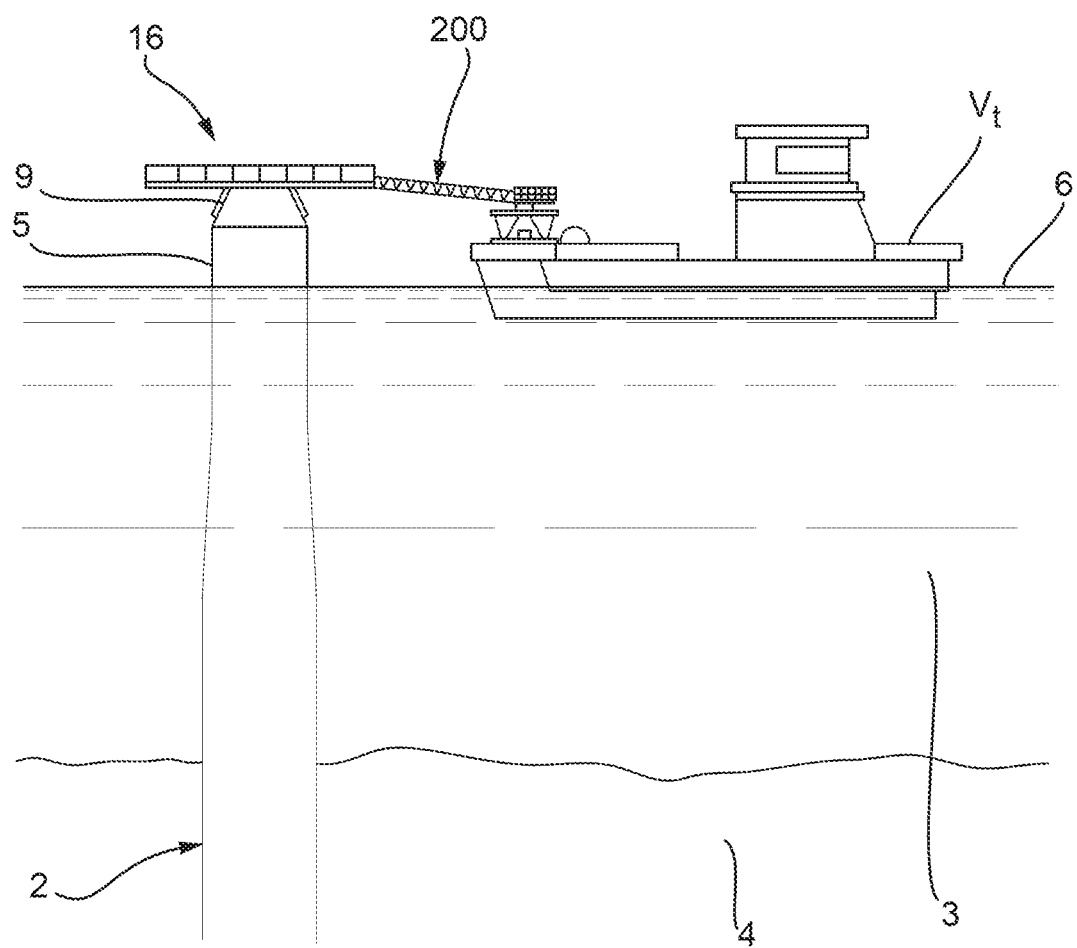

FIG. 4 shows landing of a transfer vessel Vt onto the platform 16, for allowing personnel to move onto the platform 16. Such vessel Vt can for example be provided with a motion compensated transfer system 200, such as but not limited to a system provided by Ampelmann BV, The Netherlands.

Figure 5:
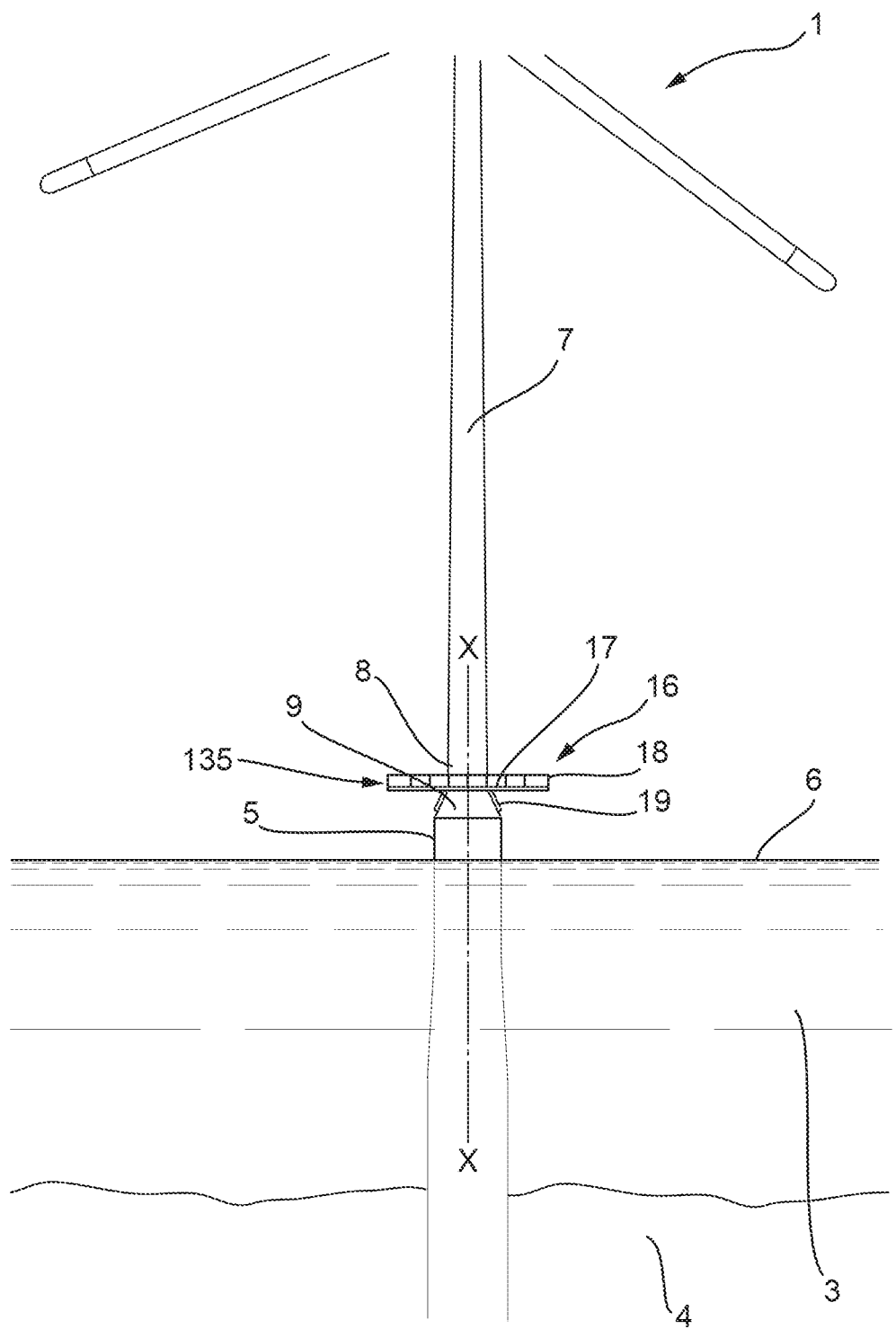

FIG. 5 shows schematically how a tower 7 of a windmill 1 has been lowered onto the upper end 9 of the pile 2, to be bolted to said upper end 9 by a bolt based mounting provision, such as the bolting provisions B. Examples of such bolt based mounting provisions will be discussed.

The windmill 1 has a tower 7 which has a lower end 8 fitted onto the upper end 9 of the pile 2. The pile 2 and a tower 7 mounted thereon have parallel, preferably collinear longitudinal axis X-X. The pile 2 has a substantially circular cross section, but can have a different cross section, such as but not limited to square, hexagonal, oblong, multi sided or the like.

In the embodiments shown the upper end 5 of the pile 2 has a substantially truncated cone shape. The lower end or mounting part 19 of the platform 16 has an opening 10 opening in axial direction, having an internal shape and configuration corresponding to at least part of the upper end 5 of the pile 2. Thus the mounting part 19 of the platform 16 can be fitted with the opening 10 over said end 5 of the pile 2 to form a slip joint 11. The slip joint 11 is preferably formed with a coating layer 14 between an inner surface area 12 of the opening 10 and an outer surface area 13 of the pile 2.

A pile 2 can generally be made of metal, such as steel. However, it can also be made of different materials, such as but not limited to concrete, or combinations thereof. The longitudinal axis X-X extends substantially vertical, having said truncated upper end 5. The upper end 5 has an outer surface area 13 sloping relative to the longitudinal axis X-X. The angle α between said surface 13 and the longitudinal axis can for example be between 1 and 45 degrees, such as for example between 2 and 40, such as for example between 2 and 35 degrees. A coating layer 14 can be provided on the said surface area 13, in embodiments forming a substantially closed covering of said surface area 13. In embodiments the coating layer 14 can have been applied as a foil, adhered to the said surface area 13 by an adhesive. The adhesive can be a pressure sensitive adhesive, for example as a layer of such adhesive provided at a back of said foil.

The coating layer 14 can in embodiments have a surface 15 at the side opposite the surface area 13, which surface 15 can have a surface roughness higher than that of the surface area 13. This will increase friction between the mounting part 19 and the pile 2. In embodiments the coating layer can comprise a resin with fibers embedded therein. The resin can for example be an acrylic resin. The fibers can be plastic fibers, for example nylon fibers. The resin and fibers can be carried on a carrier, for example a plastic carrier, such as but not limited to a polyester carrier. Prior to adhering such coating 14 to the surface area 13 a tie coat can be provided on the surface area 13, for example an epoxy or vinyl primer.

The coating layer 14 can have a small thickness, for example between a few μm and a few mm, preferably about one mm or less. Thin coating layer has an advantage since it will limit or prevent the possibility of lateral or angular movement of the platform 16, as will be discussed, relative to the pile 2. A coating 14 as provided is free of toxic components such as organotin compounds.

In embodiments instead of or additional to providing a coating layer 14 on the surface area 13 of the pile 2 such coating layer can be provided on an inner surface area 12 of the opening 10 in the platform 16.

In the present disclosure the coating 14 can be an antifouling foil as provided by the firm Micanti, The Netherlands.

In the present disclosure the slip joint 11 is formed substantially by force of gravity acting on the platform 16, as can be seen in the figures.

Using a coating 14 as disclosed in a slip joint of a platform can have the advantage that the friction between the pile 2 and the platform 16 can be increased in a simple and effective manner, improving the connection between the pile 2 and said platform. Moreover in embodiments the coating can prevent or at least reduce corrosion of the surfaces 12 and/or 13. The coating can additionally make release of the slip joint easier than when forming such slip joint between the surface areas 12, 13 directly, without said coating 14. It has been found that using such coating can provide for a firm connecting over the slip joint without the coating making release of the slip joint after a period of time, for example after several years, more difficult than when forming the slip joint traditionally between the surface areas 12, 13 directly.

Without wanting to be bound to any theory, it is believed that the coating 14 prevents corrosion of the relevant surfaces and/or stick slip of the said surface areas when releasing the structure element from the pile and/or providing the possibility of creating small relative movement of the structure element relative to the pile in a direction other than in the axial direction prior to and/or during such release.

As can be seen the coating 14 can extend further along the surface 13 and 12 than the tower 7, covering also part of said surface area 13 or the top 5 of the pile 2 below the lower end 8 of the tower 2.

Figure 6:
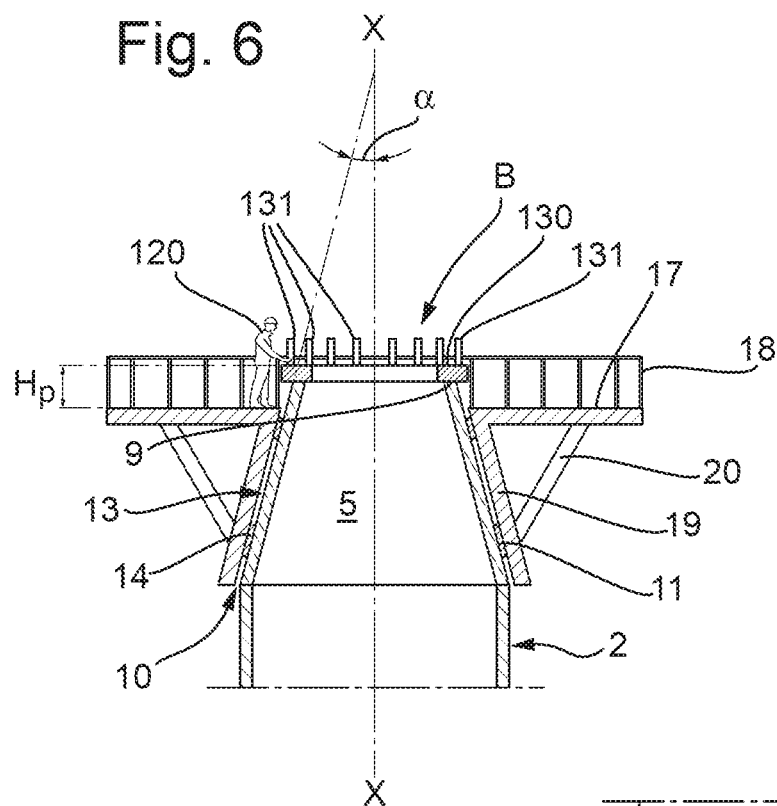
FIG. 6-7 show schematically positioning of the tower onto the foundation pile, with at least one operator on the platform, in position for bolting.
Figure 7:
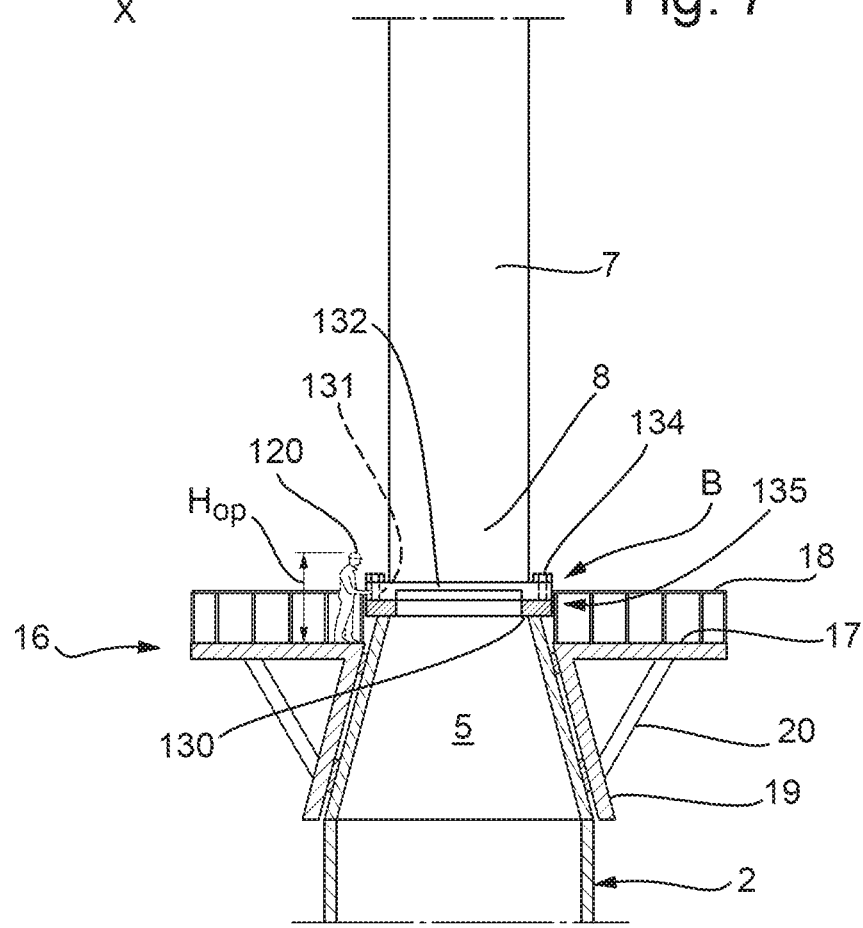

In FIG. 6-7 the mounting of the tower 7 onto the pile 2 is shown, using the platform 16. The platform 16 is placed on the pile 2, forming a slip joint 11.

In this embodiment the platform 16 comprises a substantially ring shaped walking surface 17, provided with a railing 18 and supported on a ring element 19 forming a mounting part. For structural strength supports 20 can be provided between the mounting part 19 and the platform surface 17. The ring element or mounting part 19 in this embodiment is a substantially truncated cone shaped bushing or pipe, having an internal channel forming the opening 10 with a shape and dimension substantially complementary to part of the surface area 13 of the pile 2, such that the ring element 19 can be slid onto the upper end 5 of the pile to a relatively low position on said pile 2, as shown in FIG. 6. Preferably the ring element 19 is in this position supported on the coating layer 14.

As can be seen in FIGS. 6 and 7, the walking surface 17 is provided at a height Hp just below the upper end 9 of the pile 2, for example a height Hp of about 1 meter below said upper end 9. In this embodiment a first flange 130 is connected to the upper end 9 of the pile 2, or formed thereby. It may be welded to said end, or bolted, or mounted in any other suitable way, or may be integral with said pile 2. Bolts 131 extend from said first flange 130 upward (in this case, in particular, the bolts 131 extend normally with respect to the flange). Bolts should be understood as having a broad meaning, including but not limited to any element provided with screw threads or such connecting provisions to cooperate with similar or at least complementary connecting provisions at a lower end 8 of the tower 7. By way of example only screw threads are disclosed as such connecting provisions, such as provided by bolts and complementary nuts.

As follows from the drawings, in particular, a first (mounting) surface or mounting flange 130 of the pile can be or have a transversally extending flange surface, i.e. a surface that extends radially with respect to a longitudinal center axis of the pile (wherein that transversal flange surface preferably extends horizontally when the structure has been positioned offshore, e.g. in or on the bottom of a body of water, including but not limited to the bottom of a sea or ocean). The mounting surface or mounting flange 130 can mechanically contact and support the tower after joining therewith.

Similarly, the lower end of the tower can include a transversally extending mounting/support surface (e.g. a flange surface of a flange 132) that mechanically contacts and is supported by the pile 2 after joining. It follows that said transversal support surface of the tower preferably extends horizontally when the structure has been positioned offshore.

Also, as follows from the drawings, it is preferred that bolts 131 are arranged such that their respective center lines extend substantially in parallel with center lines of the tower land pile 2 (the bolts 131 being oriented substantially vertically, i.e. having vertically arranged central bolt axes, after offshore placement of the structure).

As can be seen in FIG. 7 a person, e.g. personnel 120, can be standing on said walking surface 17 and can reach the bolts 131 easily with appropriate tools, especially without the need of ladders, climbing gear or the like. The tower 7 can be placed onto the upper end 9 of the pile 2, for example lowered by a crane C. Then the tower 7 can be secured to the pile 2 using the bolts 131 of the bolt based mounting provisions. To this end the lower end 8 of the tower 7 can for example be provided with a second flange 132, having appropriately placed openings 133 to fit over the bolts 131, such that nuts 134 can be screwed onto the bolts 131. Such bolting provisions B as such are well known in the art and provide for a secure, simple and reliable mounting of the tower 7 to the pile 2.

Figure 17:
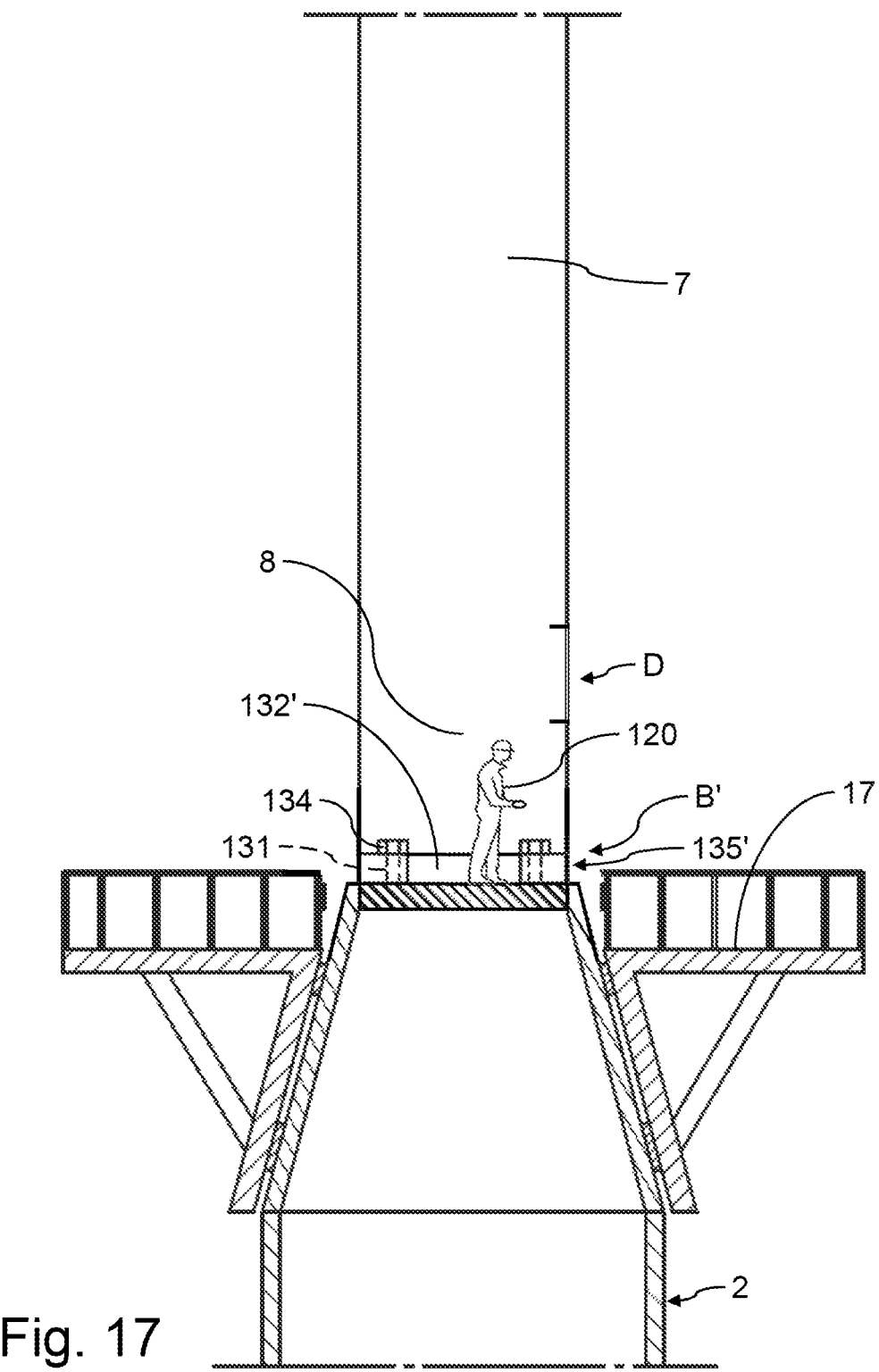
FIG. 17 shows schematically positioning of the tower onto the foundation pile, with at least one operator within the tower on the pile, in position for bolting.

It should be noted that in an alternative embodiment (see FIG. 17), personnel 120 may be standing inside the tower 7 for reaching the bolts, in particular in case of application of an inwardly extending mounting flange 132' of the tower instead of the depicted outwardly extending flange 132. For example, a lower section of the tower 7 can be provided with a passageway D, access, door or the like, allowing personnel 120 to enter an interior of the tower 7 from the platform's walking surface 17.

The platform 16 can be provided with a mooring provision 21, such as one or more mooring eyes, bollards, slings or the like. Moreover the platform 16 can be provided with a ladder 22 or such provision for persons to use to mount and/or dismount the platform 16. Moreover the platform 16 and especially the walking surface 17 can be provided for allowing access to an entrance 23 to the offshore element such as the tower 7 and/or for example stairs or an elevator.

FIG. 8-10 show schematically each a part of a connection 135 between a pile 2 and a tower 7, and part of a platform 16 mounted using a slip joint 11.

In FIG. 8 a connection 135 is shown in which a first flange 130 is connected to the upper end 9 of the pile 2. Bolts 131 have been fixed to the first flange 130, for example by welding or press fit or any other suitable way. The flange 130 extends outward from the upper end 9, i.e. has a larger outer diameter $D_{out(130)}$ than the outer diameter $D_{out(9)}$ of the upper end 9 of the pile 2. The platform 16 is formed such that it can be lowered over the first flange 130, to which end the opening 10 has a minimal inner diameter $D_{in(10)}$ larger than the said outer diameter $D_{out(130)}$ of the flange 130. This also provides that the walking surface 17 will end up the height Hp lower than the first flange 130. The tower 7 has the second flange 132 provided with the openings 133, through which the bolts 131 extend. Nuts 134 are screwed tight onto the ends of the bolts 131, against the second flange 132, or for example washers or rings or the like provided thereon, securing the tower 7 onto the pile 2.

FIG. 9 shows a similar connection 135, in which however the first flange 130 extends inward from the upper end 9 of the pile 2. Here bolts and nuts 131, 134 are used to bolt the two flanges 130, 132 together.

In FIG. 10 an embodiment is shown in which bolts 131 are secured in the upper surface 9A of an at least partly solid pile 2, for example made of concrete. The tower 7 is provided with the flange 132 to be bolted onto the bolts in a known manner.

In stead of using a first and/or second flange 130, 132, bolts and/or nuts or the like could be provided for directly at the pile 2 and/or tower 7, for example through, in and/or on the upper end 9 of the pile and/or the lower end 8 of the tower 7.

In embodiments a filler 30 can be used in between the surface 15 of the coating 14 applied to a first of the surface areas 12, 13 of the first of the pile 2 and platform 16 and the adjacent part of the surface area 13, 12 of the other one of the platform 16 and pile 2. It has been found that, due to at least the difference in surface roughness between the surface 15 and the said adjacent surface area 12, 13 small channels are formed between the coating and the said adjacent surface area 12, 13. These channels will allow flow of fluid in between the mating surfaces 15 and 12 or 13, for example free flow or flow by capillary action. In embodiments these channels are used to introduce a fluid, especially a curing fluid into at least part of said channels, filling said at least part of the channels, such that after curing said channels are blocked for fluid flow, such as flow of water or air. The curing fluid can for example be a two component curing composition, for example but not limited to a composition of a setting resin such as a thermosetting resin and a curing agent for said thermosetting resin, e.g., an unsaturated polyester resin, and a curing agent for the resin, or a curable resin composition comprising an epoxy acrylate resin composed mainly of an ester of an epoxy resin with at least one organic acid selected from the group consisting of acrylic acid and methacrylic acid, and a reactive monomer, said curing agent comprising an organic peroxide. Compositions used can for example be but are not limited to polyester, vinyl ester or epoxy resin based compositions, known in the art, which are after curing sea water resistant. The filler can also be formed by a single component curable for example by air, heat, moisture or any suitable manner.

Figure 11:
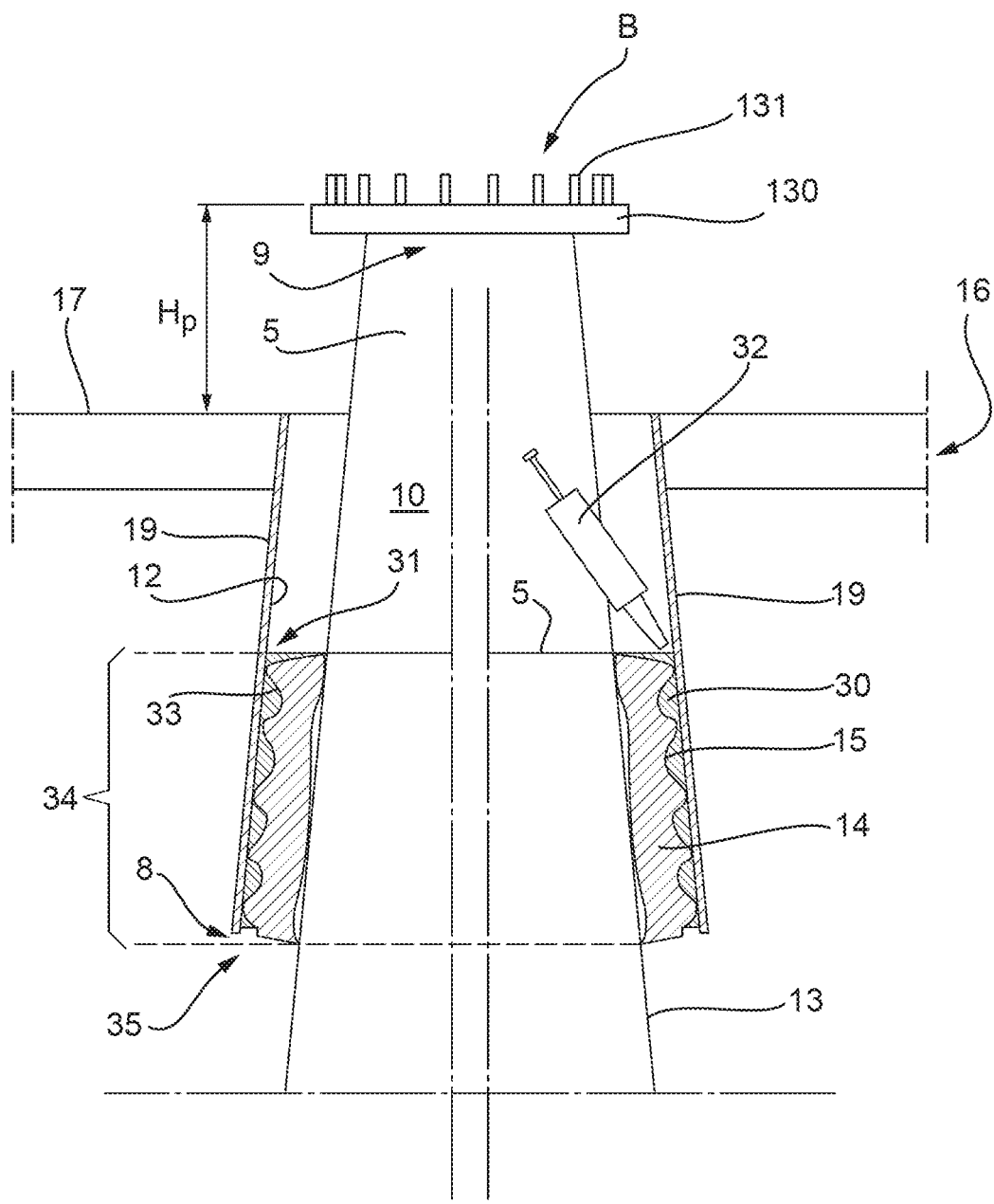
FIG. 11 shows schematically in cross section part of a slip joint between a pile and a platform mounting part, with a filler.
Figure 12:
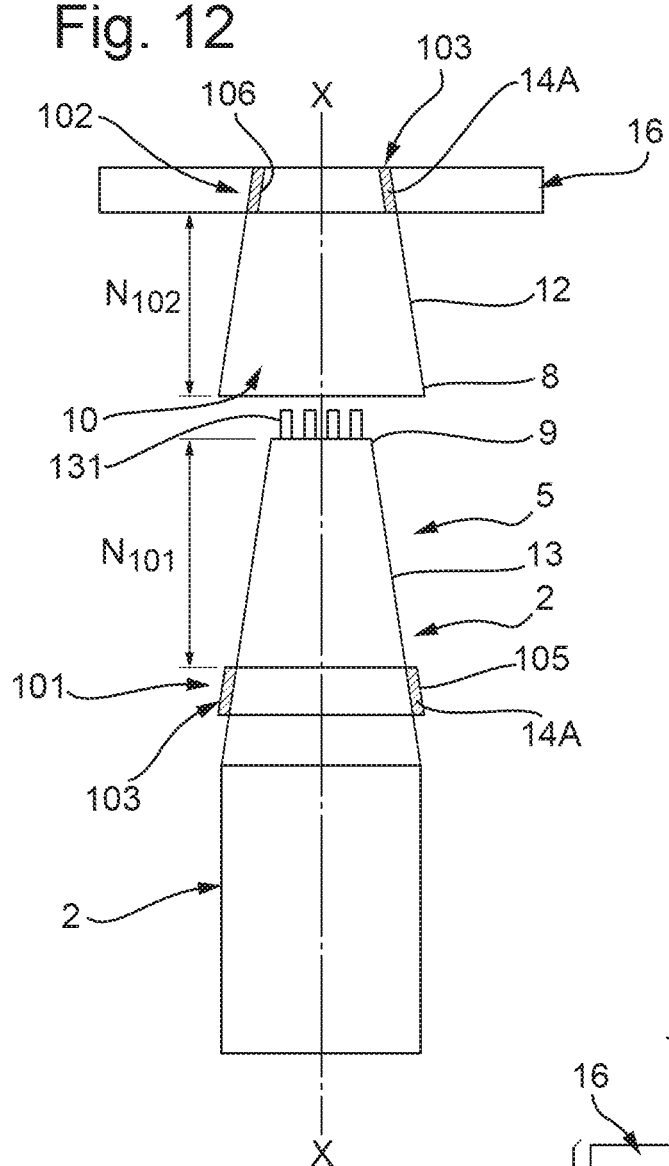
FIG. 12 shows schematically in cross section an alternative embodiment part of a foundation pile and a platform to be placed thereon.

In embodiments the curing composition or filler 30 is injected into the channels from an upper end 31 of the coating layer 14, for example by pressure injection or by gravity and/or capillary action. For example as shown in FIG. 11, not to scale, for a slip joint in which the coating is applied to the outer surface area 13 of the pile 2, wherein the said adjacent surface area is the inner surface area 12 of the platform 16. Obviously this could also be inversed or a coating 14 could be applied to both surface areas 12, 13. In this embodiment a curing composition or filler 30 has been poured or injected from the upper end 31, as schematically indicated by the injector 32. Any other suitable pouring method or injection method can be used, such as but not limited to pouring the composition onto the upper end 31 or injecting the composition directly into the channels 33 formed by at least the surface roughness of the surface 15. Inside the channels 33 the filler 30 is then allowed to cure and/or set to fill the channels 33 at least partly. In embodiments the filler 30 may, at least after curing, adhere to the surface 15 and/or to the adjacent relevant surface area 12, 13. In embodiments the filler 30 may not adhere to either or both of said surfaces 15 and 12 or 13, for example by specific choice of the coating 14 and filler 30 and/or by applying a coating onto the relevant surface or surfaces 15, and 12 or 13, preventing such adhering.

In the embodiment shown, the filler has formed a closed ring around at least part of the coating layer 14, especially filling substantially all channels 33 at least in the overlapping area 34 between the mounting part 19 of the platform 16 and the pile 2. Preferably, such that both at the upper end 31 and the lower end 35 of the slip joint 11 a closed ring of said filler 30 is formed, preventing air and/or (sea) water to enter into said slip joint 11. This will further prevent corrosion of the relevant surface areas. Alternatively, the filler may be provided such that it will only fill part of the channels 33, for example by ring injection from the lower end 35 or from the top end 31 or both, or by filling only a section of the cross section, such as for example strips of said filler extending in a substantially vertical direction, leaving channels open between the top and bottom ends 31, 35.

Using a filler as described filling at least ring-wise part of the channels of the slip joint 11, may prevent spillage of fluids such as but not limited to oil, hydraulic fluids, gasoline products, lubricants and the like which might be spilled inside the tower and could otherwise spill into the water surrounding the pile by seeping through the slip joint 11. The filler may moreover add to the mechanical strength and durability of the slip joint 11.

A filler or filler composition 30 can be applied after forming the slip joint 11, or can be provided during forming thereof, for example by coating a relevant surface area, for example area 12 or 15 with the filler or filler composition 30 prior, preferably directly prior to placing the platform 16 onto the pile 2. This can be advantageous for example when the composition or filler 30 has a relatively high viscosity or cannot flow into the channels sufficiently by capillary action, for example because of chemical incompatibility.

FIGS. 12-15 show schematically a platform, mounted on a pile 2 placed offshore in a body of water 3. The body of water 3 can for example be a sea or ocean. The platform 16 again has a mounting part 19 fitted over the upper end 9 of the pile 2.

In the embodiments shown again the upper end 5 of the pile 2 has a substantially truncated cone shape. The mounting part 19 of the platform 16 has an opening 10 opening in axial direction, having an internal shape and configuration corresponding to at least part of the upper end 5 of the pile 2. Thus the platform 16 can be fitted with the opening 10 over said end 5 of the pile 2 to form the slip joint 11. In this embodiment the slip joint 11 is formed by at least two separate areas 101, 102 of a substance 14A, which may be similar to or different from a coating 14 as discussed, between the inner surface area 12 of the opening 10 and an outer surface area 13 of the pile 2. Said surface areas 12, 13 form surface areas sloping relative to the vertical axis X-X and/or relative to each other.

In this embodiment, in stead of a single area containing the coating 14, at least two areas 101, 102 comprising a substance 14A are provided, separate from each other seen in a longitudinal direction of the pile 2 and tower 7, i.e. in the direction of the axis X-X. In the embodiment shown, a first area 101 is disclosed on the pile 2, spaced apart over a distance $N_{101}$ from an upper end 9 of the pile 2 and the second area 102 is disclosed within the mounting part 19. The two areas 101, 102 are positioned such that when the platform 16 is mounted onto the pile 2 in overlapping fashion as discussed before, the first area 101 is close to or next to the lower end of the mounting part 19 and the second area 102 is close to or next to the upper end of the mounting part, below the upper end 9 of the pile 2. By way of example, the areas 101 and 102 can be provided such that they are in the assembled position enclosed between the upper end 9 of the pile 2 and the mounting part 19 of the platform 16 and between the lower end of the mounting part 19 and the pile 2, separated over a length $L_d$ substantially equal to the length Lo of overlap when joined, which length Lo can for example be in the order of between about 1 and 10 m, for example between 1 and 5 m.

In the embodiment disclosed in FIG. 12-15 the substance 14A can be a coating 14 as disclosed previously. In the embodiment disclosed the substance 14A can be an adhesive material, such as a self-adhesive material. In the embodiment disclosed the substance 14A can be a viscoelastic material. Viscoelasticity is to be understood as at least meaning but not limited to the property of materials that exhibit both viscous and elastic characteristics when undergoing deformation. In embodiments the substance 14A can be such that upon applying it to a relevant surface of the pile 2 or mounting part 19 it will enter at least in part of said surface, for example into pores or interstitial openings in such surface. In embodiments the substance 14A can be a self-adhesive, visco-elastic material.

Figure 13:
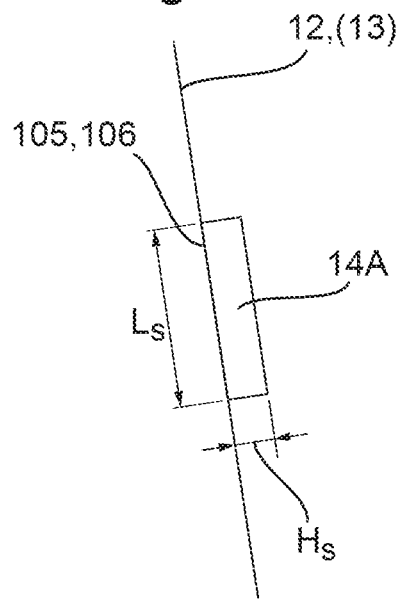
FIG. 13 shows schematically a part of a seal prior to mounting the platform onto the pile.
Figure 14:
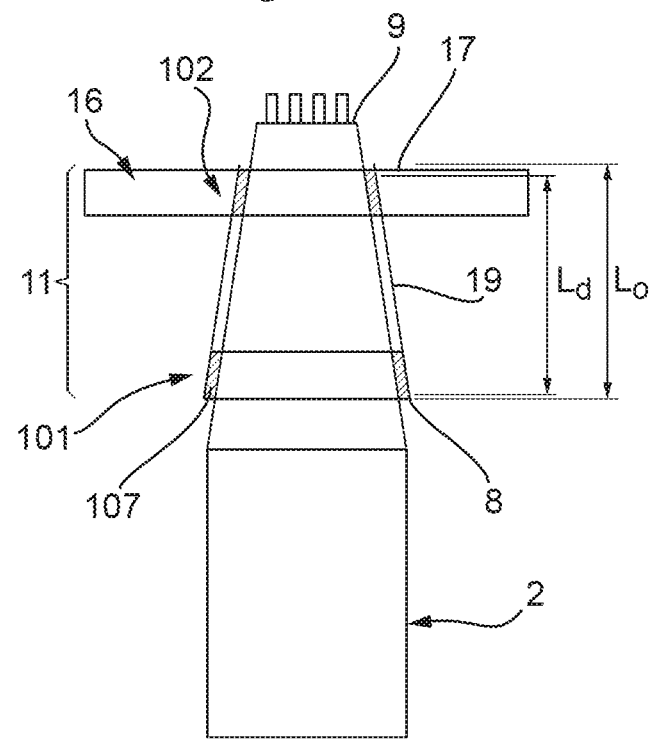
FIG. 14 shows the pile and platform of FIG. 12 in assembled state.

As can be seen in for example FIG. 13, the substance 14A, when applied to the relevant surface 12, 13, i.e. the areas 101, 102, can have a height Hs above the relevant surface 12, 13, i.e. a height measured in a direction substantially perpendicular to the said surface 12, 13, which is substantial, for example a height Hs of more than 1 mm, for example between 1 and 30 mm, such as for example between 1 and 10 mm. In embodiments, the height Hs can be between about 2 and 5 mm, such as between 2 and 4 mm on average. A substance 14A can be applied with a length Ls measured parallel to said surface 12, 13 which can be substantially longer than the height Hs. The length Ls can for example be more than 10 mm, when the height is less than 10 mm. The length Ls can for example be 30 mm when the height is less than 30 mm. The length Ls can for example be between 30 and 500 mm, for example between 30 and 300 mm, such as for example between 75 and 250 mm. In embodiments, the length Ls can be between 100 and 200 mm, for example about 150 mm. In embodiments, as for example shown in FIGS. 12-15, the substance 14A can be provided as substantially forming a ring 103 around the pile 2 and/or within the mounting part 19 of the platform 16, on or forming the respective areas 101, 102. Such ring 103 can have the discussed height Hs and length Ls.

In embodiments the substance 14A as discussed can be a sealing material. In embodiments the sealing material that is used can be a mouldable, self-adhesive and viscoelastic material. It preferably is watertight and gastight according to NEN 2768 qualifications. The sealing material can be such that it can be applied manually without the need of tools, primers or any pre-treatment of the surface. The material used can have a low surface tension and liquid-like behaviour to provide good impregnation of the surface on which it is applied, preferably such that excellent wetting is achieved on steel surfaces of a pile 2 and/or a tower 7 as well as on polymers like PE, PP and FBE. Preferably such material can have these properties persist until a −20 degrees C.). (C.°) environment without tearing, breaking or the build-up of internal stresses. In embodiments the material used as or for said substance can be Stopaq®, especially Stopaq® paste, provided by Stopaq BV, The Netherlands, or a similar sealant.

In embodiments more than one ring 103 can be provided on the pile 2 and/or within the mounting part 19, spaced apart appropriately.

Figure 16:
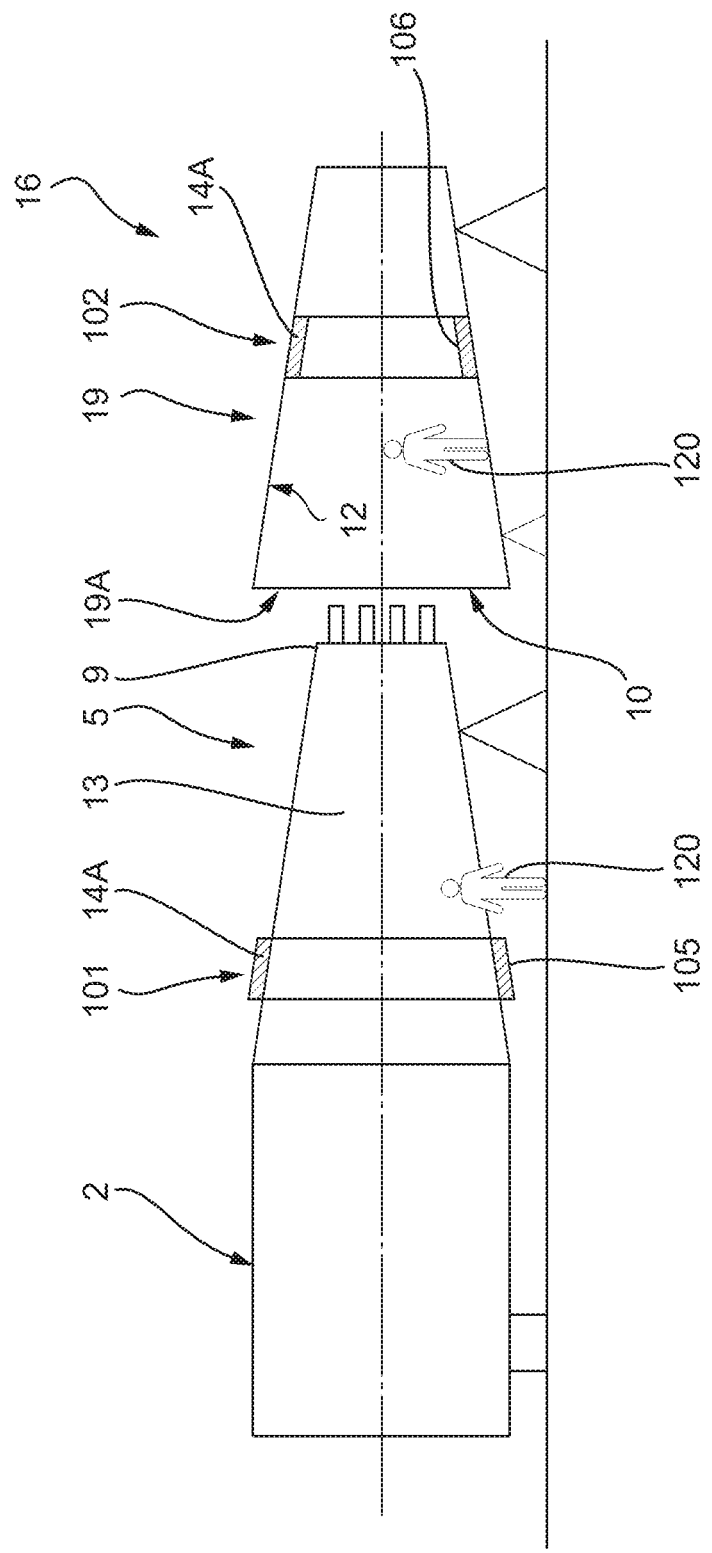
FIG. 16 shows schematically part of the platform, especially a mounting part thereof, and a pile in a horizontal position, in an embodiment during the steps of providing the substance for sealing and/or coating.

In embodiments the substance 14A such as the sealing material can be applied onto the pile 2 and/or mounting part 19 when the relevant pile 2 and/or platform 16 are in a substantially horizontal position, i.e. having the longitudinal axis X-X extending horizontally, for example on shore, for example as shown in FIG. 16. Then the pile 2 and platform 16 can be shipped to a location, where the pile 2 can be driven into the sea bed 4 or mounted in a different manner in a vertical position, as for example shown in FIGS. 1 and 2. Then the platform 16 can be lifted and lowered onto the pile 2, as discussed before. The platform 16 can be lowered easily, without the risk of damaging the substance 14A of either surface area 101, 102. Only when the mounting part 19 has been lowered almost to an end position of maximal overlap Lo the lower end of the mounting part will slide over an outward facing surface 105 of the substance 14A at the lower area 101, coming into contact with an inner surface area of the platform, whereas an inward facing surface 106 of the substance 14A on the second area 102 will be brought into contact with the outer surface of the pile 2 near the upper end 9 thereof. Sliding the mounting part 19 further down the substances 14A in the said areas 101, 102 will be compressed and party deformed, forming two spaced apart seals 107, 108 between the mounting part 19 of the platform 16 and the pile 2, forming a slip joint 11.

Figure 15:
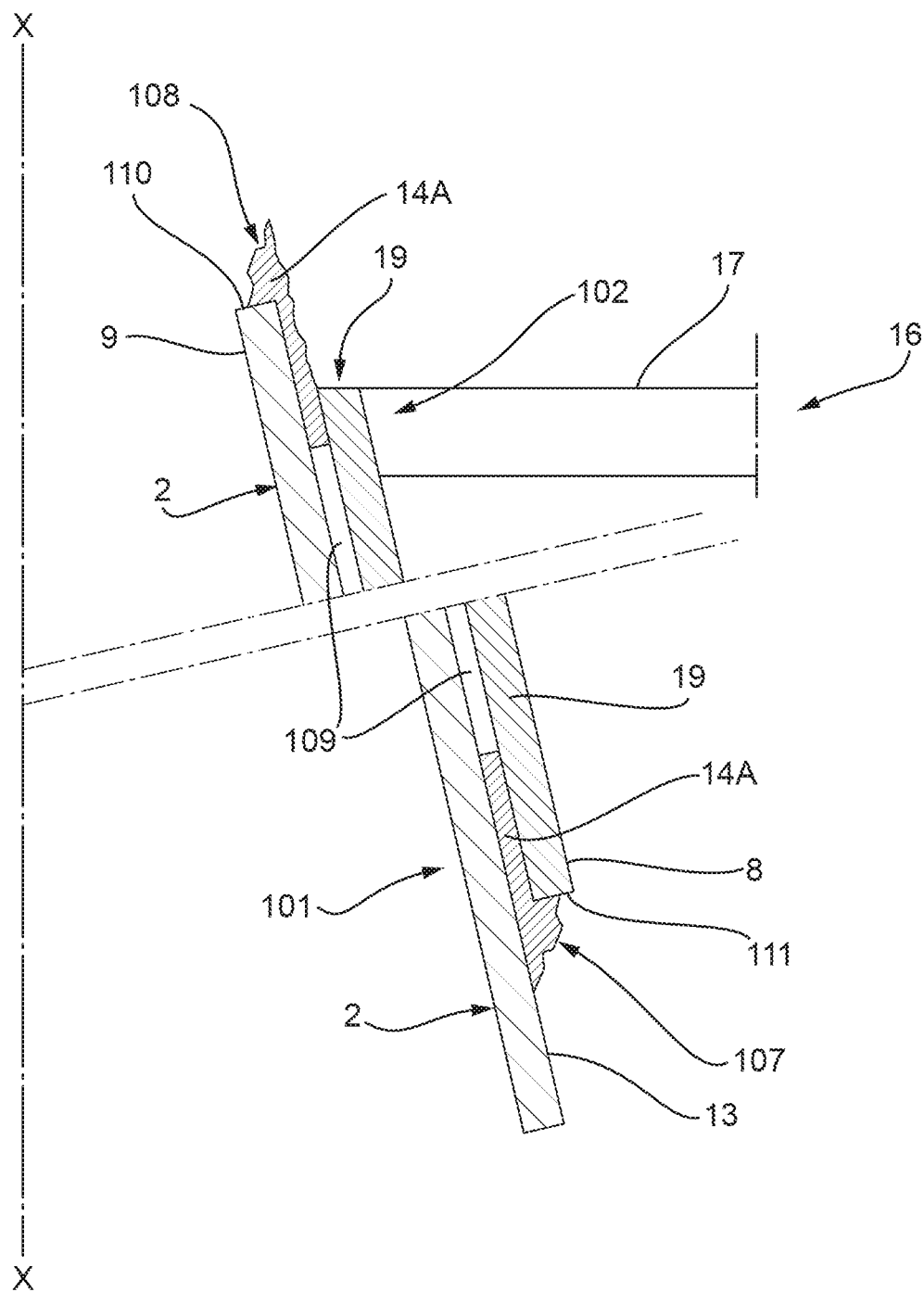
FIG. 15 schematically shows part of an upper and lower part of a joint between a pile and a platform of FIG. 12-14.

As is schematically shown in FIG. 15, the substances 14A can be deformed such that part of the substance 14A on the first area 101 will be pushed partly outside the lower end 8 of the tower 7, effectively forming a water tight and gas tight first, lower seal 107. Similarly preferably the substance in the second area 102 is partly pushed upward out onto the upper end 9 of the pile, effectively forming a water and gas tight second, upper seal 108. Preferably the seals 107, 108 are formed such that the tower 7 can be lifted back off the pile if needed.

In the embodiment shown the substance 14A is provided as a closed ring 103 on the pile 2 and in the mounting part 19. However, similarly the substance 14A can be provided differently, for example as patches. In embodiments the substance 14A can be provided for example as a strip of material having sufficient internal cohesion to be able to be draped onto the relevant surface area 101, 102. In embodiments the substance can be provided for example as a paste which can be delivered onto the relevant surface area 101, 102 for example using an injector 32 as for example shown in FIG. 11. In embodiments the substance 14A can be sufficiently viscous to be applied to a relevant surface area using a brush or roller. In embodiments the substance can be viscoelastic such that it can be kneaded and can be applied by hand, for example having a paste or gum like consistency. Any other suitable method for applying the substance 14A to the relevant areas 101 and 102 can be used.

A tower 7 can be mounted to a pile 2 using a method as discussed.

A pile 2, a platform 16 and a tower 7 can be manufactured on shore, wherein the pile 2 and tower 7 can for example be supported in a substantially horizontal position, i.e. with the longitudinal axis X-X substantially horizontally, as for example shown in FIG. 16. The platform 16 can e.g. stand on its mounting part 19, the longitudinal axis X-X substantially vertical. Preferably in this position the substance 14A is applied to at least one and preferably both areas 101, 102. When the pile 2 is in a horizontal position when applying the substance 14A, the relevant areas can be reached by an operator 120 relatively easily, for example using a ladder or scaffolding. If applicable the opening 10 can be accessed by the operator 120 to apply any substance there. This enables easy and well controlled applying of the substance 14A in a well controlled manner, especially when applying on shore, for example reducing possible influences of for example weather conditions.

After application of the substance 14A to the areas 101 and 102, at least the pile 2 and platform 16 can be loaded onto an appropriate vessel or vessels, to be shipped to a location for installing the pile 2 and platform, for example as discussed before. The tower 7 can then also be shipped, at the same time or later, to be mounted onto the pile 2.

Since the first area 101 is provided on the pile 2 spaced well apart from the upper end 9 thereof, the pile can be lifted easily by engaging the upper end above said area 101. Moreover, the pile can be driven into the bottom 4 as discussed before, for example by applying a force onto the upper end 9 of the pile 2, without risk of damaging the substance 14A provided on the first area 101.

Since the second area 102 is provided inside the mounting part of the platform, the platform 16 can be manipulated easily without running the risk of damaging the substance 14A applied to the second surface area 102.

The platform 16 can be mounted onto the pile 2 by lifting it in a vertical position to a position above the upper end 9 of the pile 2, and then lowering it onto the pile 2, as discussed before, forming a slip joint 11. Since the first area 101 is provided relatively far below the upper end 9 of the pile and the second area 102 is provided relatively high above the lower end 8 of the tower 7, contact between the pile 2 and the substance 14A on the second area 102 and contact between the platform mounting part 19 and the substance 14A on the first area 101 is prevented until the platform 16 has been lowered onto the pile 2 over a substantial distance, for example at least half of the length Lo of the overlap of the slip joint 11 when completed, for example at least 75% of said length Lo. In embodiments such contact occurs only after lowering the platform over the pile over a distance substantially equal to said length Lo minus the length Ls of the substance 14A applied onto at least one of the areas 101, 102.

When lowering the platform 16 further onto the pile 2, contact will be established between the outer surface 105 of the substance 14A on the first area and the inner surface of the platform mounting part 19, and between the outer surface 106 of the substance in the second area 102 and the outer surface of the pile 2. Due to the substantial conical shape of the relevant surfaces of the pile 2 and mounting part 19, further lowering of the platform 16 will increase friction between said outer surfaces 105 and 106 and the surfaces mating therewith, such that the substance will be pushed further against the relevant opposing surfaces of the platform 16 and pile 2, at the same time dragging at least part of the substance 14A along said surfaces, thus forming the seals 107, 108 as, by way of example, shown in FIG. 15.

Preferably the substance 14A will seal off the space 109 enclosed between said opposing surfaces of the platform mounting part 19 and pile 2, between the upper and lower seals 107, 108. Preferably the seals 107, 108 will cover at least part of the exposed end faces 110, 111 of the upper end 9 of the pile 2 and the lower end of the mounting part 19 too. Preferably the substance 14A forming the seals 107, 108 will adhere to at least one of the said surfaces of the pile 2 and/or platform that the slip joint 11 can be disengaged relatively easily by pulling the tower 7 back upward, off the pile 2.

It shall be clear that the substance 14A can also be applied to the pile 2 and/or platform 16 off shore, for example on a transporting vessel or after the pile 2 has been placed in the bottom 4.

In embodiments seals formed by the substance 14A can be combined with a coating 14, specially an anti fouling coating, for example such that said coating extends below the lower seal 107, between the two seals 107, 108 and/or above the upper seal 108.

It shall be clear from the above description and the drawings that on the one hand a slip joint 11 is formed between the platform 16 and the pile 2 (which slip joint 11 in particular does not include any bolt based mounting provision), and on the other hand the tower 7 is mounted on the pile 2 using a bolt based mounting provision B, wherein such a bolt based mounting provision B is different from, and does not include, a slip joint, and wherein preferably the slip joint 11 is different from, and does not include, a bolt based mounting provision. The platform 16 and the tower 7 are thus each substantially separately mounted to the pile 2, so that the mounting of the tower 7 to the pile 2 does not involve any formation of an actual slip joint between the tower 7 and the pile 2.

The embodiments as disclosed are shown by way of example only and should not be construed as limiting the scope of the disclosure. Many variations are possible within the scope of the invention as defined by the claims. For example the offshore element mounted on the pile can be of a different structure and can for example be supported by a series of piles as disclosed. The coating can be formed and/or applied differently. For example the coating can be provided with a different resin or combination of resins. Different types of fibers can be used, for example made of a different material or different materials, or instead of or additional to fibers other materials and element can be provided on or embedded in a resin of the coating, such as for example pallets, flakes or the like, increasing for example surface roughness of the surface 15 of the coating 14. Instead of or additional to a film or foil coating a coating layer 14 can be provided by spraying, rolling, dipping, brushing or the like, for example using a single or multiple component fluid or paste, which may be curable. The surface 15 of the coating layer 14 and/or the surface 105, 106 of the substance 14A can for example be processed, for example after application to the pile and/or tower, for example by machining or etching for manipulating the surface, especially the surface roughness or surface profile. For example dents or grooves can be provided in and/or on the surface 15, 105 and/or 106. A platform 16 can be provided in a different manner and can be formed differently, for example by mounting the walking surface directly on the ring element or integrating them into one artefact. The or each slip joint are shown as formed above the water surface. A slip joint according to the disclosure can however also be formed at or below said water surface.

These and other amendments, including but not limited to combinations of embodiments or parts thereof as disclosed are also considered to have been disclosed within the ambit of the claims.

The invention claimed is:

1. An offshore structure comprising a monopile foundation pile and a tower mounted on the pile, and a platform mounted on the pile forming a slip joint with a truncated cone shaped upper end of the pile, wherein the tower is mounted directly to the upper end of the pile using a bolt based mounting provision.

2. The offshore structure according to claim 1, wherein the platform is mounted to the pile by the slip joint, such that a walking area of the platform is provided at a level relative to the bolt based mounting provision, such that a maintenance operator can reach the bolt based mounting provision.

3. The offshore structure according to claim 1, wherein the bolt based mounting provision comprises one or more flanges, wherein the one or more flanges is/are installed:
   one flange at or near a lower end of the tower, mounted to the upper end of the pile by bolts; or
   one flange at or near the upper end of the pile to which the lower end of the tower is bolted; or
   a first flange at or near the upper end of the pile to which the lower end of the tower is bolted and a second flange at the lower end of the tower, wherein the flanges are bolted together, mounting the tower to the pile.

4. The offshore structure according to claim 1, wherein the platform extends all around the upper end of the pile when mounted, and can be lifted over the upper end of the pile and, optionally, a flange is mounted on or formed at the upper end of the pile for forming the slip joint with the upper end of the pile.

5. The offshore structure according to claim 1, wherein the height of the truncated upper end of the pile is about the same as or smaller than the maximum diameter of the truncated upper end of the pile.

6. The offshore structure according to claim 1, wherein between an inner surface of a mounting part of the platform and an outer surface of the pile:
   a coating is provided, increasing friction between said two surfaces and/or preventing corrosion of one or both of said surfaces and/or
   at least two spaced apart areas are provided with a substance, forming an upper seal and a lower seal between the outer surface and the inner surface, near the upper end of the pile and the mounting part of the platform and between a lower end of the mounting part of the platform and the pile.

7. The offshore structure according to claim 6, wherein the substance forming the upper and lower seals is a substantially visco-elastic material or compound of materials, and/or, wherein the substance is formed by a mouldable, self-adhesive material, and/or wherein said material extends at least partly over the mounting part of the platform and/or the upper end of the pile, and/or wherein the substance forms the upper seal and the lower seal between the mounting part of the platform and the pile, wherein between said seals a space is enclosed between the mounting part and the pile, and/or wherein the substance is provided between opposing sloping surfaces of the mounting part and the pile.

8. The offshore structure according to claim 7, wherein the substantially visco-elastic material or compound of materials is watertight and gastight.

9. The offshore structure according to claim 6, wherein the coating and/or the substance is provided as a foil, an adhesive foil, or a self-adhesive coating.

10. The offshore structure according claim 6, wherein the coating comprises a layer comprising fibers on a carrier foil, wherein the fibers are embedded in a resin.

11. The offshore structure according to claim 10, wherein the resin is a cured acrylic.

12. The offshore structure according to claim 6, wherein the coating and/or substance is applied on the outer surface of the pile, and/or wherein the coating and/or substance is applied to the inner surface of the mounting part of the platform.

13. The offshore structure according to claim 6, wherein the coating and/or substance is free of organotin compounds.

14. The offshore structure according to claim 6, wherein the coating, the inner surface of the mounting part of the platform, and the outer surface of the pile each has a surface roughness, wherein the surface roughness of the coating is higher than the surface roughness of the inner surface of the mounting part of the platform and/or of the outer surface of the pile.

15. The offshore structure according to claim 6, wherein a filler is provided between at least part of a surface of the coating and an adjacent surface.

16. The offshore structure according to claim 6, wherein the coating is an anti-fouling coating.

17. The offshore structure according claim 6, wherein the coating and/or substance is applied on the truncated cone shaped end of the pile.

18. The offshore structure according to claim 1, wherein the bolt based mounting provision includes at least one bolt having a center line that extends substantially in parallel with a center line of the pile and/or a center line of the tower.

19. The offshore structure according to claim 1, wherein the tower has a substantially transversally extending mounting surface that is supported by a substantially transversally extending supporting surface of the pile, said substantially transversally extending surfaces of the tower and pile being horizontally extending surfaces when the offshore structure is in a respective vertical position offshore.

20. The offshore foundation pile according to claim 1, wherein the truncated cone shaped upper end of the pile is provided with an area spaced apart from the upper end of the pile, provided with a substance for forming a seal with the platform when placed over said truncated upper end of the pile to form the slip joint, wherein said bolt based mounting provision comprises a flange for mounting the tower to said upper end of the pile.

21. The offshore structure according to claim 1, wherein the maintenance operator can reach the bolt based mounting provision while standing on the walking area or while standing within the tower on the pile.

22. The offshore structure according to claim 1, wherein the truncated upper end has an outer surface at an angle relative to a longitudinal axis of the pile of between 1 and 45 degrees.

23. A method for mounting a tower to a truncated cone shaped upper end of an offshore foundation pile, the method comprising:
   fitting a mounting part of a platform over the upper end of the offshore foundation pile;
   forming a slip joint with the upper end of the pile; and
   bolting the tower directly to the pile or to a flange provided at or by said upper end of the pile, wherein an operator, standing on said platform or standing within the tower on the pile, can bolt the tower to the pile.

24. The method according to claim 23, wherein a surface area of the truncated upper end of the pile and/or a surface area of an inner surface of the mounting part of the platform is provided with at least a visco-elastic substance prior to placing said tower on the upper end of the pile, for forming a seal between the pile and the mounting part of the platform.

25. An offshore structure comprising:
   a foundation pile;
   a tower mounted on the pile, wherein the tower is mounted directly to a truncated cone shaped upper end of the pile using a bolt based mounting provision;
   a platform mounted on the truncated cone shaped upper end of the pile and forming a slip joint with the pile; and
   a substance comprising at least one of a substantially visco-elastic material or compound of materials or a mouldable, self-adhesive material, wherein the substance is disposed between an inner surface of a mounting part of the platform and an outer surface of the truncated cone shaped upper end of the pile on at least two longitudinally spaced apart areas, and wherein the substance forms a seal between the outer surface and the inner surface.

26. The offshore structure according to claim 25, wherein said substance extends at least partly over a lower end of the mounting part of the platform and/or the upper end of the pile, and wherein the substance forms an upper seal and a lower seal between the mounting part of the platform and the upper end of the pile.

\* \* \* \* \*